(12) United States Patent
Stinner et al.

(10) Patent No.: US 11,193,247 B2
(45) Date of Patent: Dec. 7, 2021

(54) SELF-PROPELLED CONSTRUCTION MACHINE

(71) Applicant: Wirtgen GmbH, Windhagen (DE)

(72) Inventors: Tobias Stinner, Nister (DE); Sebastian Drumm, Rösrath (DE); Burkhard Frank, Vettelschoss (DE)

(73) Assignee: Wirtgen GmbH

( * ) Notice: Subject to any disclaimer, the term of this patent is extended or adjusted under 35 U.S.C. 154(b) by 0 days.

(21) Appl. No.: 17/119,021

(22) Filed: Dec. 11, 2020

(65) Prior Publication Data

US 2021/0189668 A1     Jun. 24, 2021

(30) Foreign Application Priority Data

Dec. 23, 2019   (DE) .................... 10 2019 220 552.6

(51) Int. Cl.
*E01C 23/088*       (2006.01)
*B60K 7/00*         (2006.01)
(Continued)

(52) U.S. Cl.
CPC .......... *E01C 23/088* (2013.01); *B60K 7/0015* (2013.01); *B62D 3/14* (2013.01);
(Continued)

(58) Field of Classification Search
CPC .............................. E01C 23/088; E01C 23/127
See application file for complete search history.

(56) References Cited

U.S. PATENT DOCUMENTS 4,325,580 A * 4/1982 Swisher, Jr. ........... B28D 1/186
                                                        299/39.8
6,106,073 A    8/2000 Simons et al.
(Continued)

FOREIGN PATENT DOCUMENTS

DE   102004040135 B3   12/2005
EP        916004 A1     5/1999
WO       9805822 A1     2/1998

OTHER PUBLICATIONS

European Search Report for corresponding patent application No. EP 20 21 2789, dated May 21, 2021, 5 pages (not prior art).

*Primary Examiner* — Janine M Kreck
(74) *Attorney, Agent, or Firm* — Lucian Wayne Beavers; Patterson Intellectual Property Law, PC

(57) ABSTRACT

In a self-propelled construction machine (1), in particular road milling machine, comprising a machine frame (8), at least three travelling devices (12, 16), wherein at least one of the three travelling devices (12, 16) is realized as a pivotable travelling device (16) so that said travelling device (16) is pivotable about at least one vertical pivoting axis in relation to the machine frame (8) between a first pivoted-in and at least one second pivoted-out position, at least one working device (20), in particular a milling drum, for working the ground pavement (3), at least one hydraulic drive system (70) for driving at least two travelling devices (12, 16), wherein at least one of the at least two driven travelling devices is the pivotable travelling device (16), wherein the hydraulic drive system (70) comprises at least one hydraulic pump (78), it is provided for the following features to be achieved: the hydraulic drive system (70) comprises one each hydraulic variable displacement motor (72) for driving the driven travelling devices (12) with the exception of the at least one pivotable travelling device (16), wherein the hydraulic drive system (70) comprises a hydraulic fixed displacement motor (74) for driving the at least one pivotable travelling device (16).

15 Claims, 5 Drawing Sheets

(51) Int. Cl.
*B62D 3/14* (2006.01)
*E01C 23/12* (2006.01)
*F15B 13/04* (2006.01)

(52) U.S. Cl.
CPC ............ *E01C 23/127* (2013.01); *F15B 13/04* (2013.01); *F15B 2211/40* (2013.01)

(56) References Cited

U.S. PATENT DOCUMENTS

| | | | |
|---|---|---|---|
| 2006/0039756 A1* | 2/2006 | Lemke | B60K 17/356 404/94 |
| 2010/0021234 A1* | 1/2010 | Willis | B62D 7/1509 404/90 |
| 2013/0000996 A1* | 1/2013 | Miller | E01C 23/088 180/9.46 |

* cited by examiner

SELF-PROPELLED CONSTRUCTION MACHINE

CROSS-REFERENCES TO RELATED APPLICATIONS

This application claims benefit of German Patent Application No. DE 10 2019 220 552.6, filed on Dec. 23, 2019, which is hereby incorporated by reference in its entirety.

BACKGROUND OF THE INVENTION

1. Field of the Invention

The present invention relates to a self-propelled construction machine, as well as to a method for working ground pavements.

2. Description of the Prior Art

Self-propelled construction machines, in particular road milling machines, are known, which comprise a machine frame and at least three travelling devices, wherein at least one of the three travelling devices is designed as a pivotable travelling device so that the same is pivotable about a vertical pivoting axis in relation to the machine frame between a first pivoted-in and at least one second pivoted-out position. Furthermore, such self-propelled construction machine comprises at least one working device, in particular a milling drum, for working the ground pavement. At least one hydraulic drive system is frequently provided for driving the travelling device.

On one side of the machine frame, namely, the so-called zero-clearance side of the machine frame, the working device may terminate flush with the same, wherein the pivotable travelling device is preferably arranged on said zero-clearance side of the machine frame, and wherein the pivotable travelling device is pivotable between a first pivoted-in position not projecting in relation to the zero-clearance side, and at least one second pivoted-out position projecting in relation to the zero-clearance side. The pivotable travelling device may preferably be a rear travelling device.

If the working device is to mill close to the edge along the wall of a house, for example, or a similar obstacle, pivoting the pivotable travelling device into the first pivoted-in position, preferably in front of the working device, achieves that the construction machine can drive significantly closer to the obstacle than would be the case if the travelling device were arranged next to the working device. On the other hand, when not milling close to the edge, it is desirable for the travelling device to be arranged next to the working device in order to achieve an as stable support of the machine as possible.

A problem with the construction machines described above, in which at least one travelling device is designed in a pivotable fashion, is that parts of the machine, in particular parts of the hydraulic drive system on the pivotable travelling device, most particularly the hydraulic motor of said ground-engaging unit, must not require too large an space, in particular, should extend as little as possible beyond the lateral width of the travelling devices, since otherwise, with the travelling device pivoted-in, the parts would extend beyond the other lateral parts of the construction machine on the zero-clearance side and would therefore prevent close-to-edge milling.

For this reason, in the state of the art, in construction machines with pivotable travelling devices, with a hydraulic drive system, hydraulic fixed displacement motors were used on all driven travelling devices, since these feature a smaller space than hydraulic variable displacement motors.

The hydraulic drive systems used to date comprise a hydraulic variable displacement pump and a hydraulic flow divider, which ensures that each motor is driven at the same rotational speed.

There is the problem, however, that slip may occur in individual travelling devices, which cannot be effectively counteracted by means of the hydraulic drive system described, in particular, the rotational speed of the travelling devices can only be adjusted collectively and not adapted individually as would be desirable, for example, for the adjustment of a difference in the rotational speed between the travelling devices on the inner side and outer side of the curve. It is also not possible to separately adjust the driving torque of the travelling devices.

SUMMARY OF THE INVENTION

It is therefore the object of the present invention, in a self-propelled construction machine comprising a pivotable travelling device, to improve the drive system of the travelling devices.

The aforementioned object is achieved by the features of the claims.

The present invention advantageously provides that the hydraulic drive system comprises one each hydraulic variable displacement motor for driving the driven travelling devices with the exception of the at least one pivotable travelling device, wherein the hydraulic drive system comprises a hydraulic fixed displacement motor for driving the at least one pivotable travelling device.

The hydraulic variable displacement motor may also be termed a controllable hydraulic motor. A hydraulic variable displacement motor, or controllable hydraulic motor, is a hydraulic motor, or hydro motor, which is driven by means of a pressure fluid and is adjustable in rotational speed at a constant volumetric flow rate and constant pressure of the hydraulic fluid, in particular in the hydraulic supply line assigned to the respective hydraulic variable displacement motor.

The hydraulic fixed displacement motor may also be termed a non-controllable hydraulic motor. A hydraulic fixed displacement motor, or non-controllable hydraulic motor, is a hydraulic motor, or hydro motor, which is driven by means of a pressure fluid and exhibits a constant rotational speed, or is not adjustable in rotational speed, respectively, at a constant volumetric flow rate and constant pressure of the hydraulic fluid, in particular in the hydraulic supply line assigned to the respective hydraulic fixed displacement motor.

The hydraulic drive system comprises a hydraulic pump, in particular a hydraulic variable displacement pump. Furthermore, the hydraulic drive system may also comprise a hydraulic reservoir. In a closed hydraulic circuit, the hydraulic fluid is continuously pumped from the pump via the motor and back again; in an open hydraulic circuit, the hydraulic fluid flows from the hydraulic motor into a hydraulic reservoir, from which the hydraulic fluid is drawn in again by the pump.

The hydraulic supply lines assigned to a hydraulic variable or fixed displacement motor are, in each case, those hydraulic lines in the hydraulic drive system, which run from the hydraulic pump to the respective variable or fixed displacement motor, or also from the respective variable or fixed displacement motor back to the hydraulic pump or to a hydraulic reservoir.

According to the present invention, all driven travelling devices, with the exception of the pivotable travelling device, comprise a hydraulic variable displacement motor, which enables precise adjustment of the rotational speed and therefore, for example, drive slip control on the respective travelling devices. In order to reduce the amount of slip, the respective travelling devices may be controlled individually via the hydraulic variable displacement motors.

In one embodiment, the control operation may be effected by adjusting the hydraulic variable displacement motors and the variable displacement pump in a coordinated fashion so that the desired rotational speed is achieved both on the variable displacement motors and on the fixed displacement motor.

The hydraulic drive system preferably comprises a controllable valve in the supply lines assigned to the hydraulic fixed displacement motor.

In this arrangement, the valve is intended to adapt the pressure and/or the volumetric flow rate in the supply lines of the fixed displacement motor.

In this arrangement, in particular, the torque of the engine may be adapted by adapting the pressure, or the rotational speed of the motor may be adapted by changing the volumetric flow rate.

In principle, all common valves are suitable for this purpose; in a particularly preferred embodiment, a throttle valve is used. However, the controllable valve may also, for example, be a volumetric flow rate control valve.

The hydraulic fixed displacement motor may also be controlled by means of the controllable valve. The volumetric flow rate or the pressure may be changed by means of the valve, which enables the rotational speed or the torque of the hydraulic fixed displacement motor to be changed. A behaviour similar to that of a hydraulic variable displacement motor may thus be achieved on the pivotable travelling device. It is possible, for example, to perform drive slip control. The fixed displacement motor itself, however, is not adjustable.

The controllable valve may be arranged on the pivotable travelling device.

Alternatively, the controllable valve may be arranged on the machine frame.

Four travelling devices may preferably be provided, all of which are drivable by means of the hydraulic drive system. One of the four travelling devices may preferably be the pivotable travelling device.

The hydraulic variable displacement motors may each be arranged on the respective driven travelling devices.

The hydraulic variable displacement motors may, in principle, be realized in the known fashion and may be designed, for example, as radial piston motors; particularly preferably, hydraulically adjustable axial piston motors may be provided.

The pumps known from the state of the art such as, for example, radial piston pumps may be used as hydraulic pump; particularly preferably, a hydraulic axial piston pump is used.

The travelling devices may be steerable. The travelling devices may each be steerable about a steering axis. The steering axis extends preferably vertically through the travelling device, wherein said axis extends, in particular, centrally through the travelling device.

The pivotable travelling device may also be steerable about a steering axis, in which case the vertical pivoting axis may be offset in relation to the steering axis.

According to the present invention, a method for working ground pavements using a construction machine self-propelled by means of at least three travelling devices, in particular road milling machine, may also be provided, wherein, in the construction machine, a working device, in particular a milling drum, works the ground pavement, and in which at least one of the three travelling devices is realized as a pivotable travelling device, which may be pivoted about a vertical pivoting axis in relation to the machine frame between a first pivoted-in and at least one second pivoted-out position, wherein at least two travelling devices are driven by a hydraulic drive system, wherein the hydraulic drive system comprises at least one hydraulic pump, and wherein at least one of the at least two driven travelling devices is the pivotable travelling device.

According to the present invention, it is provided in an advantageous manner that all driven travelling devices, with the exception of the at least one pivotable travelling device, are each driven via a hydraulic variable displacement motor, and the at least one pivotable travelling device is driven via a hydraulic fixed displacement motor.

The hydraulic fixed displacement motor may be controlled via a controllable valve.

As explained earlier, this offers the advantage that the hydraulic fixed displacement motor may be controlled via the valve in such a fashion that a behaviour similar to that of a variable displacement motor may be achieved and thus, for example, drive slip control may be effected.

The controllable valve may be arranged on the machine frame.

Alternatively, the controllable valve may be arranged on the pivotable travelling device.

Hereinafter, embodiments of the invention are illustrated in more detail with reference to the drawings.

BRIEF DESCRIPTION OF THE DRAWINGS

The following is shown schematically.

DETAILED DESCRIPTION

Figure 1:
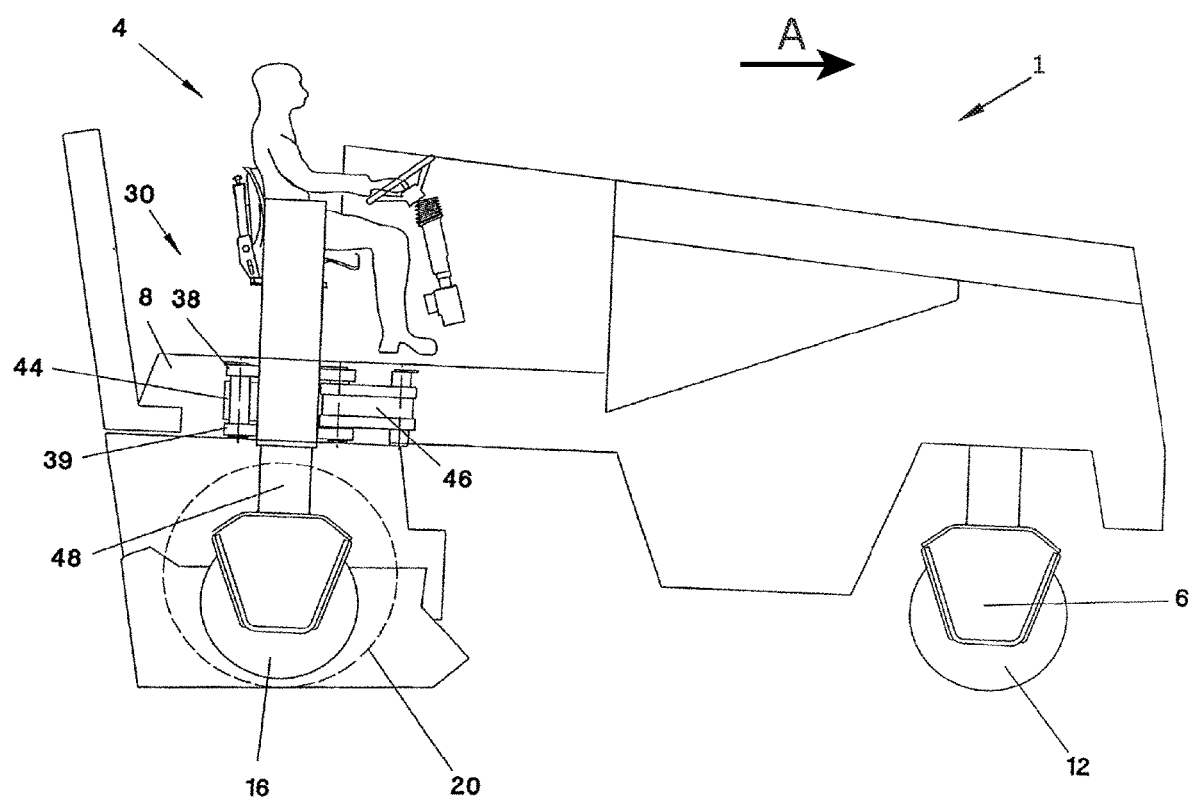
FIG. 1 a construction machine according to the present invention,
FIG. 2 a top view of the construction machine according to the present invention,
FIG. 3 drive trains of the construction machine,
FIG. 4 a schematic overview of the hydraulic drive system,
FIG. 5a-5c movement of the pivotable travelling device.

FIG. 1 shows a self-propelled construction machine 1. In the embodiment depicted, the self-propelled construction machine is a road milling machine. Said construction machine 1 comprises a machine frame 8 and at least three travelling devices 12, 16. The construction machine 1 depicted comprises two front 12 and two rear 12, 16 travelling devices, of which, in FIG. 1, the ground-engaging units arranged on the left side as seen in the direction of operation A are not visible. The travelling devices may be wheels, as in the embodiment depicted, or alternatively also tracked ground-engaging units.

Figure 2:
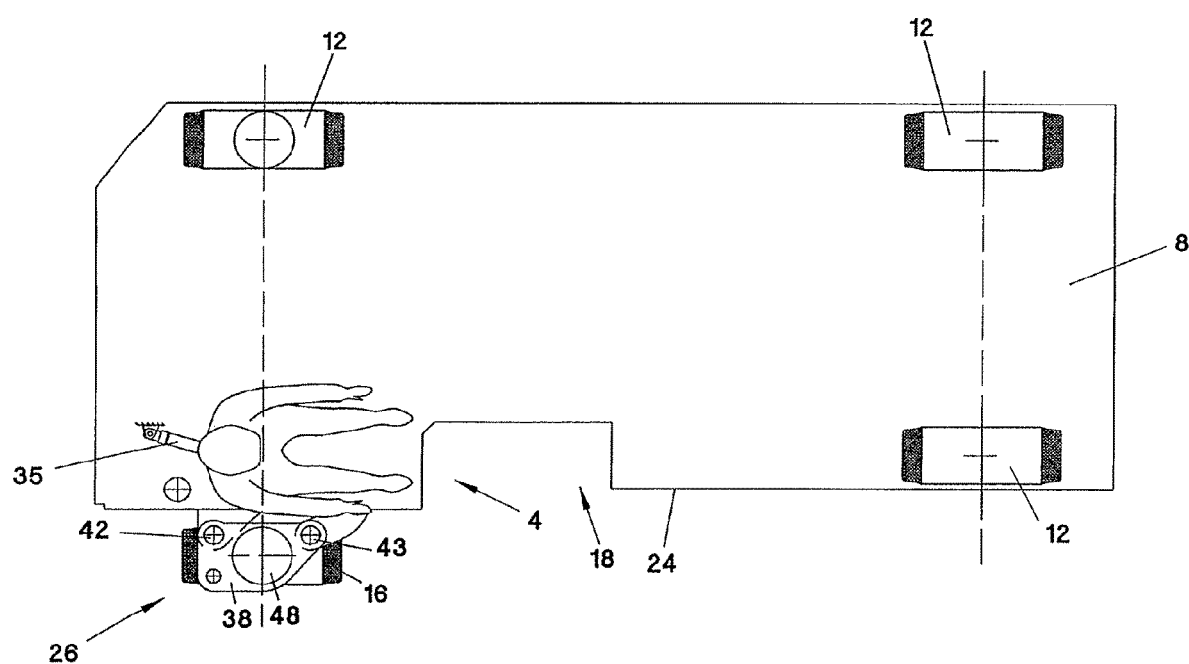

The travelling devices 12, 16 may each be driven by means of at least one hydraulic drive system 70. In a construction machine 1, at least two travelling devices may be driven, wherein, for example, the front travelling devices 12 may also be non-driven. At least one of the at least three travelling devices 12, 16 is realized as a pivotable travelling device 16. Said travelling device 16 may be pivotable about at least one vertical pivoting axis in relation to the machine frame 8 between a first pivoted-in and at least one second pivoted-out position. This is explained in more detail based on FIGS. 2 and 5 *a-c*.

Furthermore, at least one working device 20 is provided, which, as in the embodiment depicted, may be a milling drum to work the ground pavement 3. The at least one pivotable travelling device 16 may also be drivable by means of the hydraulic drive system 70. As can be inferred from FIG. 2, the construction machine 1 comprises a so-called zero-clearance side 24. The working device 20, with its one front end, is arranged nearly flush with the zero-clearance side 24 of the machine frame 8 so that close-to-edge working is possible on the zero-clearance side of the construction machine 1. For this purpose, the pivotable travelling device 16 is pivoted, from the pivoted-out position 26 beyond the zero-clearance side plane depicted in FIG. 2, inwards into a cut-out 18 of the machine frame 8 so that the outer edge of the pivotable travelling device may terminate flush with the zero-clearance side 24.

The pivoting device for the pivotable travelling device 16 may comprise a link mechanism 30. The link mechanism may, for example, be designed, as depicted, with four articulations 40, 41, 42, 43 comprising vertical axes of articulation and with two links 44, 46 pivotable in a horizontal plane. Two articulations 40, 41 may be provided on the machine frame 8 in a stationary fashion, and two articulations 42, 43 may each be provided on the pivotable travelling device 16 in two vertically spaced support plates 38, 39.

The pivotable travelling device may also be pivotable in more than one outer pivoted-out position.

Figure 3:
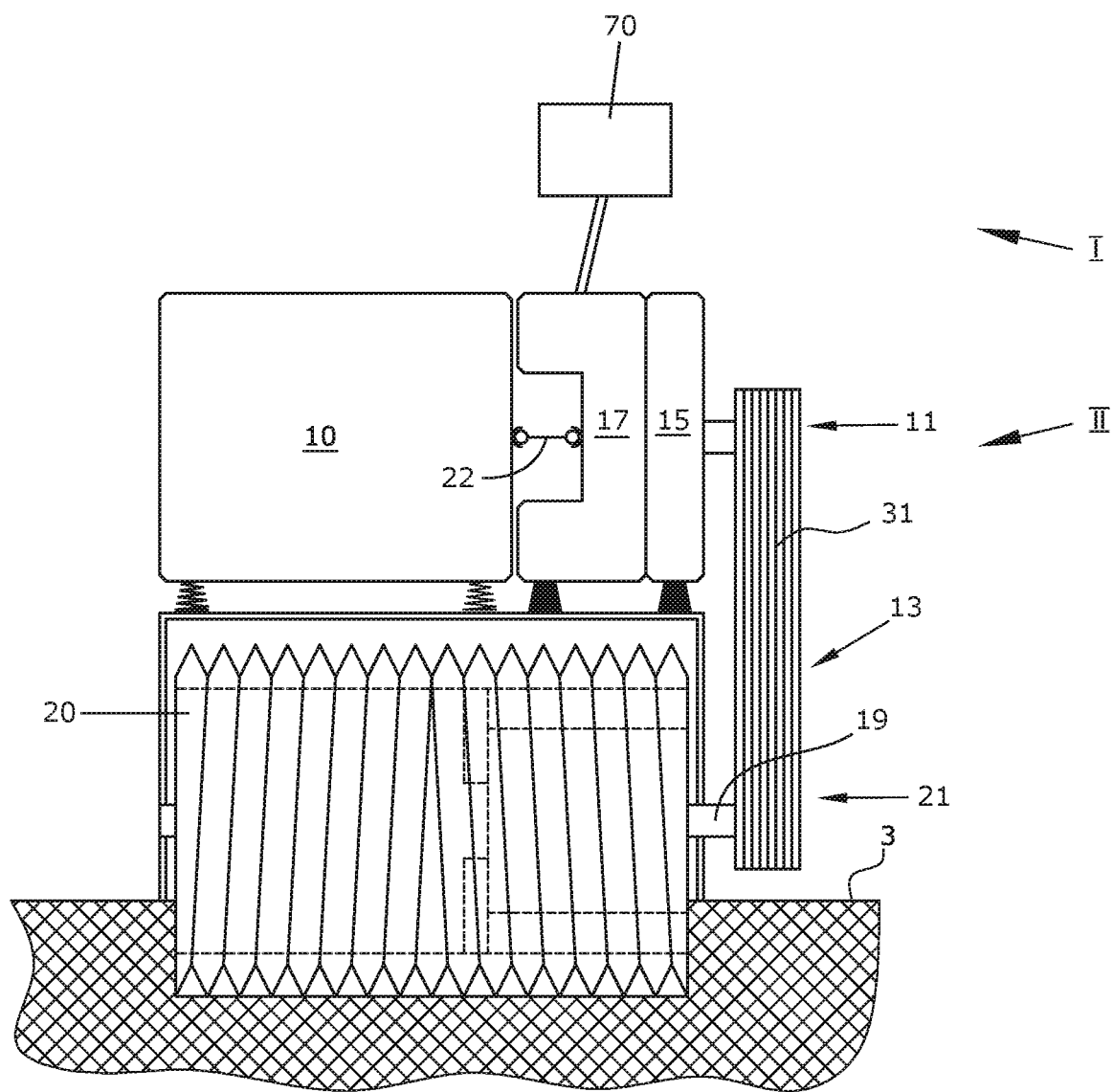

FIG. 3 shows a drive train of the construction machine 1. A first drive train I serves the purpose of transmitting the driving power to the travelling devices 12, 16. Said drive train I comprises a hydraulic drive system 70. A second drive train II is provided for transmitting the driving power to the milling drum 20. The hydraulic drive train 70 is explained in more detail in FIG. 4. The drive train II for driving the milling drum 20 is depicted in more detail in FIG. 3. A drive motor, in particular a combustion engine 10, may be provided. The drive motor 10 may be provided, via a flexible connection 22, with a pump transfer gearbox 17 for driving the first drive train I for driving a hydraulic drive system 70 for driving the travelling device 12, 16.

In the second drive train II for driving the milling drum 20, a clutch 15 may be provided between the drive motor 10 and the milling drum 20. Said clutch 15 may be a device for switching the torque.

A traction mechanism 13 for the mechanical drive of the milling drum 20 may be arranged between the clutch 15 and the milling drum 20. The traction mechanism 13 comprises a drive element 11 which is coupled, in a torsionally rigid fashion, to the drive shaft 23 of the drive motor 10. The traction mechanism 13 furthermore comprises a drive element 21 which is coupled, in a torsionally rigid fashion, to the drive shaft 19 of the milling drum 20. A gearbox may also be arranged between the drive shaft 19 and the milling drum 20.

The traction mechanism 13 is preferably a belt drive, wherein the drive elements and driven elements may be comprised of belt pulleys 11, 21, with one or a plurality of drive belts 31 running over said belt pulleys 11, 21. The traction mechanism 13 may also be a chain drive, wherein the drive elements and driven elements may be comprised of sprockets. In principle, the drive motor may also be hydraulic or electric.

Figure 4:
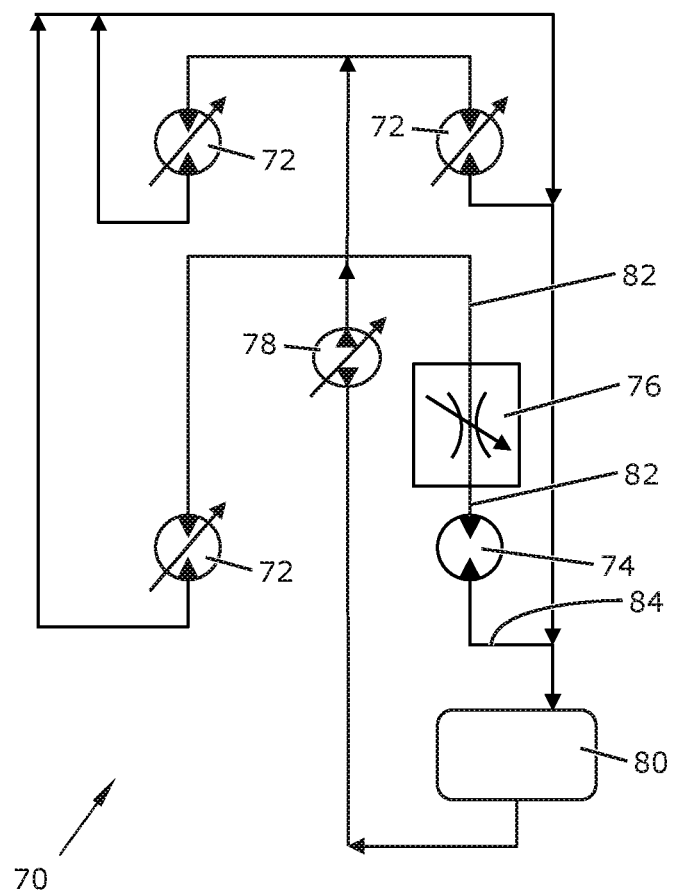

The hydraulic drive system 70 is depicted in a roughly schematic manner in FIG. 4. Said hydraulic drive system comprises at least one hydraulic pump 78, preferably a hydraulic variable displacement pump.

The hydraulic drive system 70 comprises one each hydraulic variable displacement motor 72 for each driven travelling device 12 with the exception of the at least one pivotable travelling device 16. The hydraulic variable displacement motors are each preferably arranged on the respective travelling devices 12. Furthermore, the hydraulic drive system may also comprise a hydraulic reservoir 80.

A hydraulic fixed displacement motor 74 is provided for driving the at least one pivotable travelling device 16.

A hydraulic fixed displacement motor features a smaller space than a hydraulic variable displacement motor.

In the embodiment depicted, a controllable valve 76, in particular a throttle valve, is arranged in the supply lines 80, 82 assigned to the hydraulic fixed displacement motor 74. The hydraulic supply lines assigned to a hydraulic variable or fixed displacement motor are, in each case, those hydraulic lines in the hydraulic drive system 70, which run from the hydraulic pump to the respective variable or fixed displacement motor, or also run from the respective variable or fixed displacement motor to a hydraulic reservoir. The supply lines assigned to the fixed displacement motor in the embodiment depicted are lines 82, 84. The supply line 82 leads from the hydraulic pump 78 to the hydraulic fixed displacement motor 74.

The supply line 84 leads from the fixed displacement motor 74 to the hydraulic reservoir 80. In the embodiment depicted, the controllable valve 76 is arranged in the supply line 82 between the hydraulic pump 78 and the hydraulic fixed displacement motor 74.

By means of the controllable valve 76, the hydraulic fixed displacement motor 74 may be controlled in such a fashion that a behaviour similar to that of a hydraulic variable displacement motor may be achieved. The controllable valve 76 realized as a throttle valve is preferably a proportional valve. The drop in pressure at the throttle valve, and therefore the hydraulic pressure at the hydraulic motor, may be changed via the throttle valve, thereby adapting the torque of the fixed displacement motor. Spinning of the travelling device may be prevented, for example, by reducing the driving torque.

In principle, it is also possible to control the volumetric flow rate by means of a volumetric flow rate control valve in lieu of a throttle valve, and thus specify the rotational speed of the hydraulic motor and therefore also of the travelling device.

Sensors for determining the rotational speeds at the travelling devices may be provided for the travelling devices 12, 16. These may, for example, be pick-up sensors. It may be determined by means of the sensors as to whether any slip is occurring at the respective travelling device 12, 16, in particular by comparing the rotational speeds of the travelling devices. In the event that any slip is occurring, said slip may be reduced by controlling the individual hydraulic variable displacement motors and/or the throttle valve.

Figure 5A:
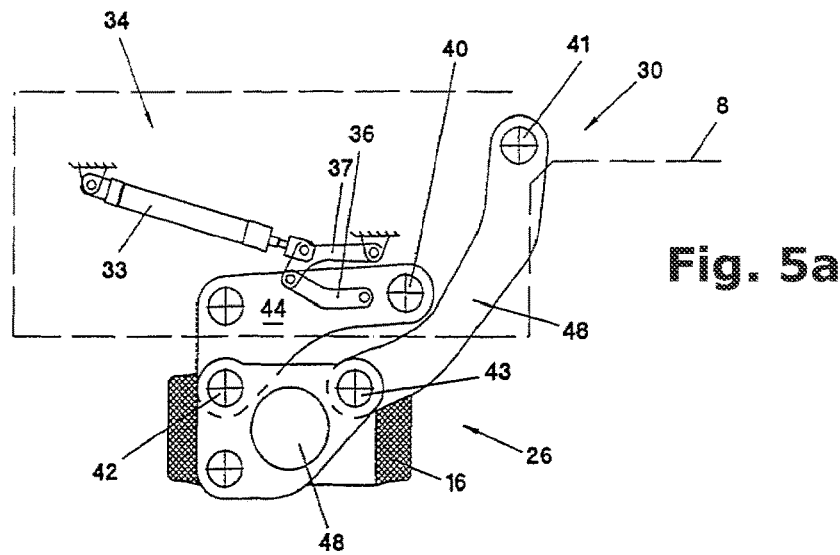
Figure 5B:
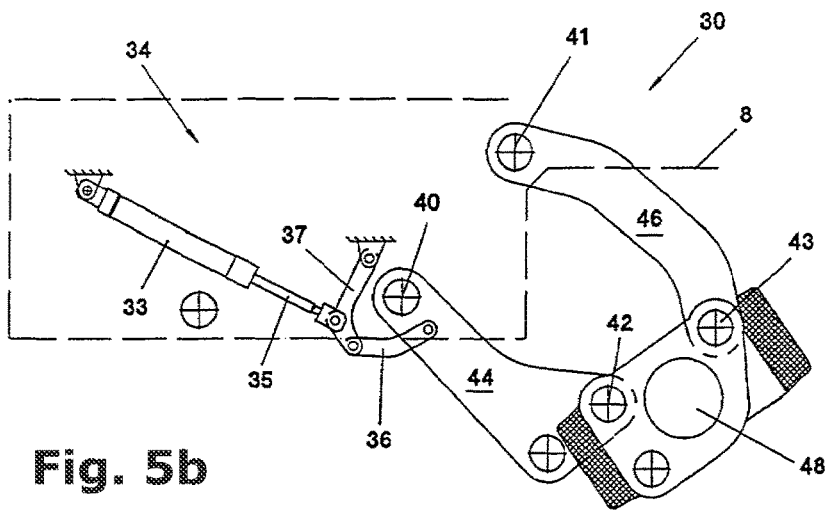
Figure 5C:
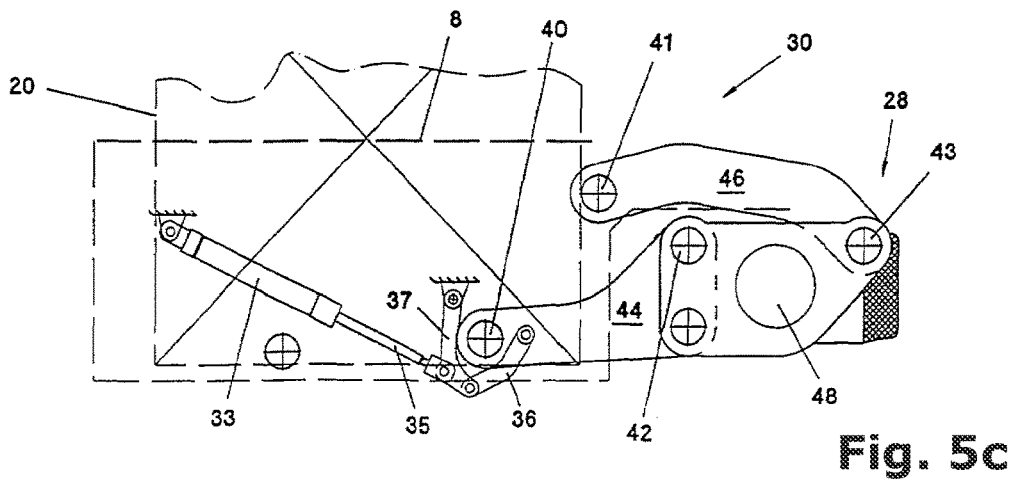

FIGS. 5*a* to 5*c* illustrate once again in more detail how the pivotable travelling device 16 may be pivoted. The travelling device 16 may be moved from a second pivoted-out position 26 into a first pivoted-in position 28 by means of a driving device 34. There may be more than one pivoted-out position.

The driving device 34 is comprised of a hydraulic piston-cylinder unit 33 comprising a push rod 35 and two control arms 36, 37. The control arm 37 is designed as a two-armed lever, wherein the one end is mounted on the machine frame 8 and the other end is connected to the second control arm 36 in an articulated fashion. The other end of the second control arm 36 is connected to the link 44 of the pivoting device.

The push rod 35 may be operated by the vehicle operator on the operator's platform 4. In the retracted position of the push rod 35, the travelling device 16 is in the second pivoted-out position, projecting beyond the zero-clearance side 24. In the extended condition of the push rod 35, the link mechanism 30 is pivoted so that the travelling device 16 may be moved into the first pivoted-in position. Prior to the pivoting operation, the travelling device 16 may be raised by means of the lifting column 48 in order that the travelling device 16 may be pivoted without ground contact. Locking of the link mechanism 30 may be effected in the first pivoted-in position. In principle, other pivoting devices are also known in which pivoting may be effected, for example, while maintaining the ground contact of the travelling device 16.

The pivotable travelling device 16 may be pivotable about vertical pivoting axes 40, 41. The vertical pivoting axis, about which the pivotable travelling device may be pivoted, may also be movable.

The invention claimed is:

1. A self-propelled road milling machine, comprising:
   a machine frame;
   at least three ground engaging units configured to support the machine frame, at least one of the ground engaging units being a pivotable ground engaging unit pivotable about at least one vertical pivoting axis in relation to the machine frame between a first pivoted-in position and at least one second pivoted-out position;
   a milling drum supported from the machine frame for working a ground pavement; and
   at least one hydraulic drive system configured to drive the pivotable ground engaging unit and at least one of the other ground engaging units, the hydraulic drive system including:
     at least one hydraulic pump;
     a hydraulic fixed displacement motor configured to drive the pivotable ground engaging unit; and
     at least one hydraulic variable displacement motor configured to drive each of the at least one of the other ground engaging units.

2. The self-propelled road milling machine of claim 1, wherein:
   the hydraulic drive system further includes a supply line connected to the hydraulic fixed displacement motor and a controllable valve disposed in the supply line.

3. The self-propelled road milling machine of claim 2, wherein:
   the controllable valve is arranged on the machine frame.

4. The self-propelled road milling machine of claim 2, wherein:
   the controllable valve is arranged on the pivotable ground engaging unit.

5. The self-propelled road milling machine of claim 2, wherein:
   the controllable valve is a throttle valve or a volumetric flow rate control valve.

6. The self-propelled road milling machine of claim 1, wherein:
   the at least three ground engaging units include four ground engaging units, one of the four ground engaging units being the pivotable ground engaging unit; and
   the hydraulic drive system is configured to drive all of the four ground engaging units.

7. The self-propelled road milling machine of claim 1, wherein:
   each of the at least one hydraulic variable displacement motor is arranged on a respective one of the ground engaging units.

8. The self-propelled road milling machine of claim 1, wherein:
   each of the at least one hydraulic variable displacement motor is a hydraulically adjustable axial piston motor.

9. The self-propelled road milling machine of claim 1, wherein:
   the hydraulic pump is a hydraulic axial piston pump.

10. The self-propelled road milling machine of claim 1, wherein:
    the hydraulic fixed displacement motor is a non-adjustable axial piston motor.

11. The self-propelled road milling machine of claim 1, wherein:
    the pivotable ground engaging unit is configured to be steerable about a steering axis, the steering axis being offset in relation to the at least one vertical pivoting axis.

12. The self-propelled road milling machine of claim 1, wherein:
    the machine frame includes a zero-clearance side configured such that the milling drum terminates flush with the zero-clearance side; and
    the pivotable ground engaging unit is arranged on the zero-clearance side of the machine frame and is configured such that in the first pivoted-in position the pivotable ground engaging unit does not project from the zero-clearance side, and in the at least one second pivoted-out position the pivotable ground engaging unit projects in relation to the zero-clearance side.

13. A method for working a ground pavement using a self-propelled road milling machine, the self-propelled road milling machine including a machine frame, at least three ground engaging units configured to support the machine frame from the ground pavement, at least one of the ground engaging units being a pivotable ground engaging unit pivotable about at least one vertical pivoting axis in relation to the machine frame between a first pivoted-in position and at least one second pivoted-out position, a milling drum supported from the machine frame for working the ground pavement, and at least one hydraulic drive system configured to drive the pivotable ground engaging unit and at least one of the other ground engaging units, the method comprising:
    driving the pivotable ground engaging unit with a hydraulic fixed displacement motor; and
    driving each of the at least one of the other ground engaging units with a hydraulic variable displacement motor.

14. The method of claim 13, further comprising:
    controlling the hydraulic fixed displacement motor with a controllable valve.

15. The method of claim 14, wherein:
    the controllable valve is arranged on the machine frame.

* * * * *